(12) United States Patent
Kurian et al.

(10) Patent No.: US 12,326,923 B2
(45) Date of Patent: Jun. 10, 2025

(54) ARTIFICIAL INTELLIGENCE IMPERSONATION DETECTOR

(71) Applicant: Bank of America Corporation, Charlotte, NC (US)

(72) Inventors: Manu Kurian, Dallas, TX (US); Ana Maxim, Arlington, VA (US); Vinesh Young Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 18/224,187

(22) Filed: Jul. 20, 2023

(65) Prior Publication Data

US 2025/0028798 A1    Jan. 23, 2025

(51) Int. Cl.
*G06F 21/31* (2013.01)
(52) U.S. Cl.
CPC .................. *G06F 21/316* (2013.01)
(58) Field of Classification Search
CPC ............... G06F 21/316; G06F 16/3344; G06F 16/3329; G06F 16/243; G06N 20/00
USPC ............................................................ 726/7
See application file for complete search history.

(56) References Cited

U.S. PATENT DOCUMENTS

| | | | |
|---|---|---|---|
| 9,292,493 B2* | 3/2016 | Chandramouli | H04L 63/1416 |
| 11,178,275 B2* | 11/2021 | Wang | H04M 3/2281 |
| 2019/0028509 A1* | 1/2019 | Cidon | H04L 63/1425 |
| 2021/0312395 A1* | 10/2021 | Harsham | H04L 51/21 |
| 2022/0232017 A1* | 7/2022 | Qualls | H04L 63/1416 |
| 2023/0162091 A1* | 5/2023 | Gupta | G06F 16/583 |
| | | | 706/12 |
| 2023/0412655 A1* | 12/2023 | Abraham | G06F 40/10 |
| 2024/0126794 A1* | 4/2024 | Cook | H04L 51/02 |

(Continued)

FOREIGN PATENT DOCUMENTS

WO    WO-2023108254 A1 *  6/2023    ......... G06F 18/2148

OTHER PUBLICATIONS

Huang et al., "Stop Deceiving! An Effective Defense Scheme Against Voice Impersonation Attacks on Smart Devices," in IEEE Internet of Things Journal, vol. 9, No. 7, pp. 5304-5314, 1 Apr. 1, 2022, doi: 10.1109/JIOT.2021.3110588.*

(Continued)

*Primary Examiner* — Lizbeth Torres-Diaz
(74) *Attorney, Agent, or Firm* — Weiss & Arons LLP (57) ABSTRACT

Artificial intelligence (AI) impersonation detection using an AI model is provided. Methods may train an AI model. The training may provide the AI model with a first dataset including a communication between two or more human users, a second and third dataset including an impersonation of the communication by a public AI model and a private AI model respectively. Methods may identify a first identifier set in the first dataset, a second identifier set in the second dataset and a third identifier set in the third dataset. Methods may create a parameter range for the first, second and third identifier set. The methods may include monitoring a production communication using the AI model. The AI model may compare the production communication with the parameter ranges. Methods may identify a smallest comparison value. Methods may, based on the identified smallest comparison value, identify the origin of the production communication.

20 Claims, 5 Drawing Sheets

(56) References Cited

U.S. PATENT DOCUMENTS

| | | | |
|---|---|---|---|
| 2024/0160902 A1* | 5/2024 | Padgett | G06N 3/0895 |
| 2024/0211477 A1* | 6/2024 | Gampa | G06F 16/3329 |
| 2024/0289362 A1* | 8/2024 | Williams | G06Q 50/01 |
| 2024/0406182 A1* | 12/2024 | Llamas Virgen | G06F 21/316 |

OTHER PUBLICATIONS

Nuakoh et al., "Detecting Impersonation in Social Network Sites (SNS) Using Artificial Immune Systems (AIS)," SoutheastCon 2018, St. Petersburg, FL, USA, 2018, pp. 1-3, doi: 10.1109/SECON.2018.8479274.*

Zarei et al., "Impersonation on Social Media: A Deep Neural Approach to Identify Ingenuine Content," 2020 IEEE/ACM International Conference on Advances in Social Networks Analysis and Mining (ASONAM), The Hague, Netherlands, 2020, pp. 11-15, doi: 10.1109/ASONAM49781.2020.9381437.*

* cited by examiner

ARTIFICIAL INTELLIGENCE IMPERSONATION DETECTOR

FIELD OF TECHNOLOGY

The field of technology relates to artificial intelligence.

BACKGROUND OF THE DISCLOSURE

Currently, Artificial intelligence ("AI") systems with natural language processing ("NLP") software may be capable of replicating a human response. AI systems may be equipped with voice cloning software. AI systems may also be able to use digital manipulation to replicate one person's likeness with another person's likeness, colloquially known as deepfake software. AI systems may be able to replicate human sounds, human looks and human language. Such AI systems may raise security concerns because the AI systems may be able to impersonate one or more entities.

Therefore, it would be desirable to create an AI system to recognize distinct human interactions from possible impersonations by AI systems.

SUMMARY OF THE DISCLOSURE

Systems, apparatus and methods for detecting artificial intelligence (AI) impersonation are provided. The methods may include using an AI model to detect when another AI model is impersonating a human user.

Humans may interact differently with other entities based on a number of factors. Such factors may include the relationship between the human and the other entities, the setting of the interaction and the subject of the interaction. Such interactions may be public interactions, private interactions, professional interactions or any other suitable interactions.

AI systems may be able to replicate what they can learn. At times, data used to train AI systems may include publicly available data. Other times, data used to train AI systems may include personal data. Personal data may be used to train the AI systems for a specific entity or organization. Based on the data used to train the AI systems, AI systems may or may not be able to replicate a human during a private or professional interaction. Also, AI systems may manifest specific styles or patterns based on the data used to train AI systems.

An AI system may be able to differentiate between both AI systems trained by publicly available data and privately available data.

An AI model may include a processing unit. The processing unit may provide processing capabilities to the AI model. The processing unit may be a central processing unit ("CPU"). The processing unit may be a graphical processing unit ("GPU"). The processing capabilities may be used by the AI model to perform processing and computing functions.

The AI model may receive data. The AI model may receive large amounts of data. The data may be received from different sources. The data may be received from entity specific sources. The data may be received from public sources. The data may be received from private sources. Data that is received from public sources may include information that can be shared, used, reused and/or redistributed without restriction. Data that is received from private sources may include personal, personally identifiable, financial, sensitive or regulated information of a specific person or entity.

The AI model may learn from experience via iterative processing and algorithmic training. The AI model may include progressive learning algorithms. The progressive learning algorithms may ingest the data. The progressive learning algorithms may analyze the ingested data. The progressive learning algorithms may analyze the data for correlations and patterns within the data. The progressive learning algorithms may use the analyzed correlations and patterns to make predictions. The AI model may update the progressive learning algorithm based on the predictions curated from the analyzed correlations and patterns. A combination of the data, the predictions and/or the progressive learning algorithm may be used to dynamically program the AI model.

The AI model may test and measure the accuracy of generated outputs. By providing the AI model with labeled training and testing datasets, the AI model may measure the accuracy of the generated output by comparing the generated outputs to the labeled training and testing datasets. Based on the comparing of the generated outputs to the labeled training and testing datasets, the AI model may update the progressive learning algorithm to provide a more accurate performance. The AI model may improve predictions by using training and testing datasets. The training of the AI model may be dynamically updated using testing and training sets.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and predict outcomes. The AI model may include natural language processing ("NLP"). NLP may enable AI models to recognize, analyze, interpret and understand written and/or spoken human language. The AI model may include any other suitable algorithms or components.

The methods may include training a first AI model. The training may occur in a pre-detection stage. The pre-detection stage may occur before the first AI model is used to detect whether an AI model is impersonating a human user. The pre-detection stage may enable the first AI model to identify whether an AI model is impersonating a human user.

Training may include providing a first dataset to the first AI model. The first dataset may include a communication. The communication may be a textual communication. The communication may be an audio communication. Audio communications may be transcribed from audio format to text format. The communication may be executed between two or more human users.

Training may include providing a second dataset to the first AI model. The second dataset may include an impersonation of the communication. The impersonation of the communication may be a copy of the communication that includes randomized identifiers. As such, an impersonation may include a set of facts similar to the communication, however, the identifiers may be changed.

The second dataset may include a first intentional impersonation of the communication. The first intentional impersonation may include a first deliberate impersonation of the communication. The first AI model may generate the first intentional impersonation of the communication. The first AI model may generate the first intentional impersonation using a second AI model. The second AI model may receive data from a private database.

Training may include providing a third dataset to the first AI model. The third dataset may include a second intentional impersonation of the communication. The second intentional impersonation may include a second deliberate impersonation of the communication. The first AI model may generate the second intentional impersonation of the communication. The first AI model may generate the second intentional impersonation using a third AI model. The third AI model may receive data from a public database.

The methods may include using the first AI model to compare the first, second and third datasets. The first AI model may compare the three datasets to identify differences between the three datasets. Based on the identified differences, the AI model may identify identifiers specific to each dataset. Based on the comparing, the methods may include identifying a first set of identifiers in the first dataset. The methods may include identifying a second set of identifiers in the second dataset. The methods may include identifying a third set of identifiers in the third dataset. At times, each set of identifiers may be unique to each dataset.

In an exemplary embodiment, the first dataset may include identifiers that indicate that the communication is between two humans. The identifiers may include emotions, word choice, enunciations or any other suitable human communication characteristics. For example, identifiers that may indicate a human-to-human communication may include the use of a nickname in place of a name, word choices relating to specific cultures or geographic locations, natural flow and rhythm to the conversation, errors that are consistent with human conversation and the like.

The second dataset may include identifiers that the communication is generated by a public AI model. The identifiers may include stylistic word choices, conversation topics that are based primarily on public knowledge, and any other suitable public AI communication characteristics. For example, identifiers that may indicate a public AI generated communication, may include, a factual based conversation, elimination of tone and emotion from the conversation, shallow and generalized conversation topics and the like.

The third dataset may include identifiers that indicate that the communication is generated by a private AI model. The identifiers may include stylistic word choices, conversations that are based on private knowledge and any other suitable private AI communication characteristics. For example, identifiers that may indicate a private AI generated communication, may include, overly formal conversation tone, contrived emotion throughout the conversation, repetitive and redundant conversation topics and the like.

The methods may include creating a parameter range reference. The parameter range reference may be used as a marker for identifying whether a production communication is a human communication, public AI generated communication or private AI generated communication. Creating the parameter range reference may include using the first set of identifiers to determine a first parameter range. Creating the parameter range reference may include using the second set of identifiers to determine a second parameter range. Creating the parameter range reference may include using the third set of identifiers to determine a third parameter range. The first, second, and third parameter ranges may be combined to create a parameter range reference.

The methods may include and/or operate a detection mode. In the detection mode, the first AI model may monitor a production communication. The production communication may be a live communication. The production communication may be a historical communication. The production communication may be a communication between two or more users. The production communication may be a phone call. The production communication may be a video messaging communication. The production communication may be any suitable form of electronic communication. The users may be human users. The users may be AI users. The methods may include detecting when the communication is between human users or AI users.

The monitoring may include comparing the production communication to the first parameter range, included in the parameter range reference. The comparing may include comparing the production communication to the first set of identifiers included in the first parameter range. The comparing may include outputting a first comparison value. The first comparison value may be a numeric representation of a numerical metric of discrepancies between the production communication and the compared first parameter range. For example, a small comparison value may indicate that the production communication and the first parameter range may be similar. A large comparison value may indicate that the production communication and the first parameter range may include less than a threshold number of similarities.

The monitoring may include comparing the production communication to the second parameter range included in the parameter range reference. The comparing may include comparing the production communication to the second set of identifiers included in the second parameter range. The comparing may include outputting a second comparison value. The second comparison value may be a representation of a numerical metric of discrepancies between the production communication and the compared second parameter range. For example, a small comparison value may indicate that the production communication and the second parameter range may be similar. A large comparison value may indicate that the production communication and the second parameter range may include less than a threshold number of similarities.

The monitoring may include comparing the production communication to the third parameter range included in the parameter range reference. The comparing may include comparing the production communication to the third set of identifiers included in the third parameter range. The comparing may include outputting a third comparison value. The third comparison value may be a representation of a numerical metric of discrepancies between the production communication and the compared third parameter range. For example, a small comparison value may indicate that the production communication and the third parameter range may be similar. A large comparison value may indicate that the production communication and the third parameter range may include less than a threshold number of similarities.

The monitoring may include identifying a smallest comparison value from the first, second and third comparison values. The smallest comparison value may have the smallest numeric value. The methods may include identifying a parameter range that corresponds to the identified smallest comparison value. For example, when the smallest comparison value is the first comparison value, the methods may include identifying that the first comparison value corresponds to the first parameter range. The methods may include identifying a dataset from the first, second and third datasets that corresponds to the identified parameter range. For example, when the smallest comparison value and its corresponding parameter range is determined to be the first parameter range, the methods may include identifying that the smallest comparison value corresponds to the first dataset.

Based on the identified dataset, the methods may include detecting that the production communication is a human communication, a private AI communication or a public AI communication. For example, when the smallest comparison value and the corresponding parameter range and dataset is identified as a first parameter range and dataset, the methods may include identifying that the production communication is a human communication. When the smallest comparison value and the corresponding parameter range and dataset is identified as a second parameter range and dataset, the methods may include identifying that the production communication is generated by the public AI model. When the smallest comparison value and the corresponding parameter range and dataset is identified as a third parameter range and dataset, the methods may include identifying that the production communication is generated by the private AI model.

When the production communication is a live communication, the methods may include terminating the communication when the production communication is identified as being generated by the public AI model. When the production communication is identified as being generated by the private AI model, the methods may include terminating the communication. When the production communication is identified as being a human communication, the methods may include enabling the continuation of the communication.

When the production communication is a historical communication, the methods may include flagging the communication as an impersonation communication when the first AI model detects that production communication is generated by a private AI model. When the production communication is a historical communication, the methods may include flagging the communication as an impersonation communication when the first AI model detects that production communication is generated by a public AI model. Flagging the production communication may include tagging a metadata portion of the production communication. Flagging the production communication may include tagging a metadata portion of the production communication as an impersonation communication.

The methods may include transmitting an impersonation notification message to the two or more human users. The impersonation notification message may notify the two or more human users of an impersonation of the production communication by a private AI model. The impersonation notification message may notify the two or more human users of the impersonation of the production communication by a private AI model.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Apparatus, methods and systems for using an artificial intelligence ("AI") model to detect artificial intelligence impersonation are provided. The apparatus may include a pre-detection monitor.

The pre-detection monitor may include one or more nodes. The one or more nodes may be a laptop, smartphone, desktop computer, mainframe computer, tablet or any other suitable computing devices. The pre-detection monitor may include a processor. The processor may include hardware. The processor may include software. The processor may provide instructions and processing power used by the pre-detection monitor. The processor may provide instructions and processing capabilities used by the pre-detection monitor to train an AI model. The AI model may be a first AI model.

The first AI model may be trained to detect an impersonation of a communication between two or more users. The first AI model may include a processing unit. The processing unit may provide processing capabilities to the first AI model. The processing unit may be a central processing unit ("CPU"). The processing unit may be a graphical processing unit ("GPU"). The processing capabilities may be used by the first AI model to perform processing and computing functions.

The first AI model may receive data. The first AI model may receive large amounts of data. The data may be received from different sources. The data may be received from entity specific sources. The data may be received from public sources. The data may be received from private sources. Data received from public sources may include information that can be shared, used, reused and/or redistributed without restriction. Data received from private sources may include personal, personally identifiable, financial, sensitive or regulated information of a specific person or entity.

The first AI model may learn from experience via iterative processing and algorithmic training. The first AI model may include progressive learning algorithms. The progressive learning algorithms may ingest the data. The progressive learning algorithms may analyze the ingested data. The progressive learning algorithms may analyze the data for correlations and patterns within the data. The progressive learning algorithms may use the analyzed correlations and patterns to make predictions. The first AI model may update the progressive learning algorithm based on the predictions curated from the analyzed correlations and patterns. A combination of the data, prediction and/or progressive learning algorithm may be used to dynamically program the first AI model.

The first AI model may test and measure the accuracy of generated outputs. By providing the first AI model with labeled training and testing datasets, the first AI model may measure the accuracy of the generated output by comparing the generated outputs to the labeled training and testing datasets. Based on the comparing of the generated outputs to the labeled training and testing datasets, the first AI model may update the progressive learning algorithm to be able to provide a more accurate performance. The first AI model may improve predictions by using training and testing datasets. The training first of the AI model may be dynamically updated using testing and training sets.

The first AI model may include machine learning algorithms. Machine learning algorithms may enable the first AI model to learn from experience without specific instructional programming. The first AI model may include deep learning algorithms. Deep learning algorithms may utilize neural networks. Neural networks may use interconnected nodes or neurons in a layered structure to analyze data and predict outcomes. The first AI model may include natural language processing ("NLP"). NLP may enable the first AI model to recognize, analyze, interpret and understand written and/or spoken human language. The AI model may include any other suitable algorithms or components.

The pre-detection monitor may train the first AI model by providing a plurality of datasets to the first AI model. The plurality of datasets may include a first dataset. The first dataset may include a communication. The communication may be between one or more human users. The communication may be a telephonic communication. The communication may be an electronic communication. The communication may be video call communication. The communication may be any suitable communication between two or more human users. The communication may be a textual communication. The communication may be an audio communication. Audio communications may be transcribed from audio format to text format.

The plurality of datasets may include a second dataset. The second dataset may include an impersonation of the communication. The impersonation of the communication may be a copy of the communication that includes randomized identifiers. As such, an impersonation may include a set of facts similar to the communication, however, the identifiers may be changed.

The second dataset may be a first intentional impersonation of the communication. The first intentional impersonation may include a first deliberate impersonation of the communication. The first AI model may generate the first intentional impersonation of the communication. The first AI model may generate the first intentional impersonation using a second AI model. The second AI model may receive data from a private database. The second AI model may be a private AI. A private AI may include an AI model that is trained with data that is received from private sources. The data may include one or more of personal, personally identifiable, financial, sensitive or regulated information of a specific person or entity.

The plurality of datasets may include a third dataset. The third dataset may include a second intentional impersonation of the communication. The second intentional impersonation may include a second deliberate impersonation of the communication. The first AI model may generate the second intentional impersonation of the communication. The first AI model may generate the second intentional impersonation using a third AI model. The third AI model may receive data from a public database. The third AI model may be a public AI model. A public AI model may include an AI model that is trained with data that is received from public sources. The data may include publicly available information that can be shared, used, reused and/or redistributed without restriction.

The first AI model may compare the first, second and third datasets. The first AI model may run an algorithm to compare the first, second and third datasets. The algorithm may be a progressive learning algorithm. The algorithm may detect differences between the first, second and third datasets. Based on the comparison, the first AI model may identify a first set of identifiers in the first dataset. Based on the comparison, the first AI model may identify a second set of identifiers in the second dataset. Based on the comparison, the first AI model may identify a third set of identifiers in the third dataset. At times, each set of identifiers may be unique to each dataset.

In an exemplary embodiment, the first dataset may include identifiers that indicate that the communication is between two humans. The identifiers may include emotions, word choice, enunciations or any other suitable human communication characteristics. For example, identifiers that may indicate a human-to-human communication may include the use of a nickname in place of a name, word choices relating to specific cultures or geographic locations, natural flow and rhythm to the conversation, errors that are consistent with human conversation and the like.

The second dataset may include identifiers that the communication is generated by a public AI model. The identifiers may include stylistic word choices, conversation topics that are based primarily on public knowledge, and any other suitable public AI communication characteristics. For example, identifiers that may indicate a public AI generated communication, may include, a factual based conversation, elimination of tone and emotion from the conversation, shallow and generalized conversation topics and the like.

The third dataset may include identifiers that indicate that the communication is generated by a private AI model. The identifiers may include stylistic word choices, conversations that are based on private knowledge and any other suitable private AI communication characteristics. For example, identifiers that may indicate a private AI generated communication, may include, overly formal conversation tone, contrived emotion throughout the conversation, repetitive and redundant conversation topics and the like.

The first AI model may create a parameter range reference. The parameter range reference may include a first parameter range. The first parameter range may be determined using the first set of identifiers. The parameter range reference may include a second parameter range. The second parameter range may be determined using the second set of identifiers. The parameter range reference may include a third parameter range. The third parameter range may be determined using the third set of identifiers.

The first, second and third parameter ranges may be used to determine when a production communication is a human communication, a private AI communication, or a public AI communication. The parameter range reference may be used as a baseline reference to determine when a production communication is a human communication, a private AI communication, or a public AI communication. The parameter range reference may be compared with a production communication to determine when the communication is a human communication, a private AI communication, or a public AI communication.

The apparatus may include a detection monitor. The detection monitor may include one or more nodes. The one or more nodes may be a laptop, smartphone, desktop computer, mainframe computer, tablet or any other suitable computing devices. The detection monitor may include a processor. The processor may include hardware. The processor may include software. The processor may provide instructions and processing capabilities used by the detection monitor. The processor may provide instructions and processing capabilities used by the detection monitor to run the first AI model. The first AI model may detect when a production communication is an impersonation communication.

The first AI model may run the progressive learning algorithm to monitor a production communication. The production communication may be between two or more users. The users may be human users. The users may be public AI models. The users may be private AI models. The production communication may be a telephone communication. The production communication may be an email communication. The production communication may be any suitable electronic communication between two users. The production communication may be a real time communication. The production communication may be a historical communication.

The first AI model may compare the production communication to the first parameter range. Based on the comparison, the first AI model may output a first comparison value. The first comparison value may correspond to a numerical metric of the number of discrepancies between the first parameter range and the production communication. The smaller the comparison value, the more similar the production communication may be to the parameter range reference.

The first AI model may compare the production communication to the second parameter range. Based on the comparison, the first AI model may output a second comparison value. The second comparison value may correspond to a numerical metric of the number of discrepancies between the second parameter range and the production communication. The smaller the comparison value, the more similar the production communication may be to the parameter range reference.

The first AI model may compare the production communication to the third parameter range. Based on the comparison. the first AI model may output a third comparison value. The third comparison value may correspond to a numerical metric of the number of discrepancies between the third parameter range and the production communication. The smaller the comparison value, the more similar the production communication may be to the parameter range reference.

The first AI model may identify the smallest comparison value from the first, second and third comparison values. The smallest comparison value may indicate the parameter range that is most similar to the production communication. The first AI model may identify a parameter range from the first, second and third parameter ranges corresponding to the identified smallest comparison value. The first AI model may identify from the first, second and third set of identifiers a set of identifiers corresponding to the identified parameter range. The first AI model may identify from the first, second and third datasets, a dataset corresponding to the identified set of identifiers. Based on the identified dataset, the first AI model may detect that the production communication is a human communication, a private AI communication or a public AI communication.

In an exemplary embodiment, the first AI model may identify the second parameter range as having the smallest comparison value. The first AI model may identify that the second parameter range corresponds to the second set of identifiers. The first AI model may identify that the second set of identifiers may correspond to the second dataset. Based on identifying that the smallest comparison value corresponds with the second dataset, the first AI model may identify that the production communication is a private AI communication.

When the production communication is a real time communication, the detection monitor may terminate the production communication in response to detecting that the production communication is generated by a public AI model. When the production communication is a real time communication, the detection monitor may terminate the production communication in response to detecting that the production communication is generated by a private AI model. When the production communication is a real time communication, the detection monitor may enable the continuation of the production communication, in response to detecting that the production communication is human communication.

When the production communication is a historical communication, the detection monitor may flag a production communication that is determined by the first AI model as being a generated by a public AI model. When the production communication is a historical communication, the detection monitor may flag a production communication that is determined by the first AI model as being a generated by a private AI model. Flagging the production communication may include tagging a metadata portion of the production communication. The tagging may include tagging the metadata portion of the production communication as an impersonation communication.

The detection monitor may transmit an impersonation notification message to the two or more users. The detection monitor may transmit the impersonation notification message in response to detecting an impersonation of the production communication. The impersonation notification message may notify the two or more users of the impersonation communication.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
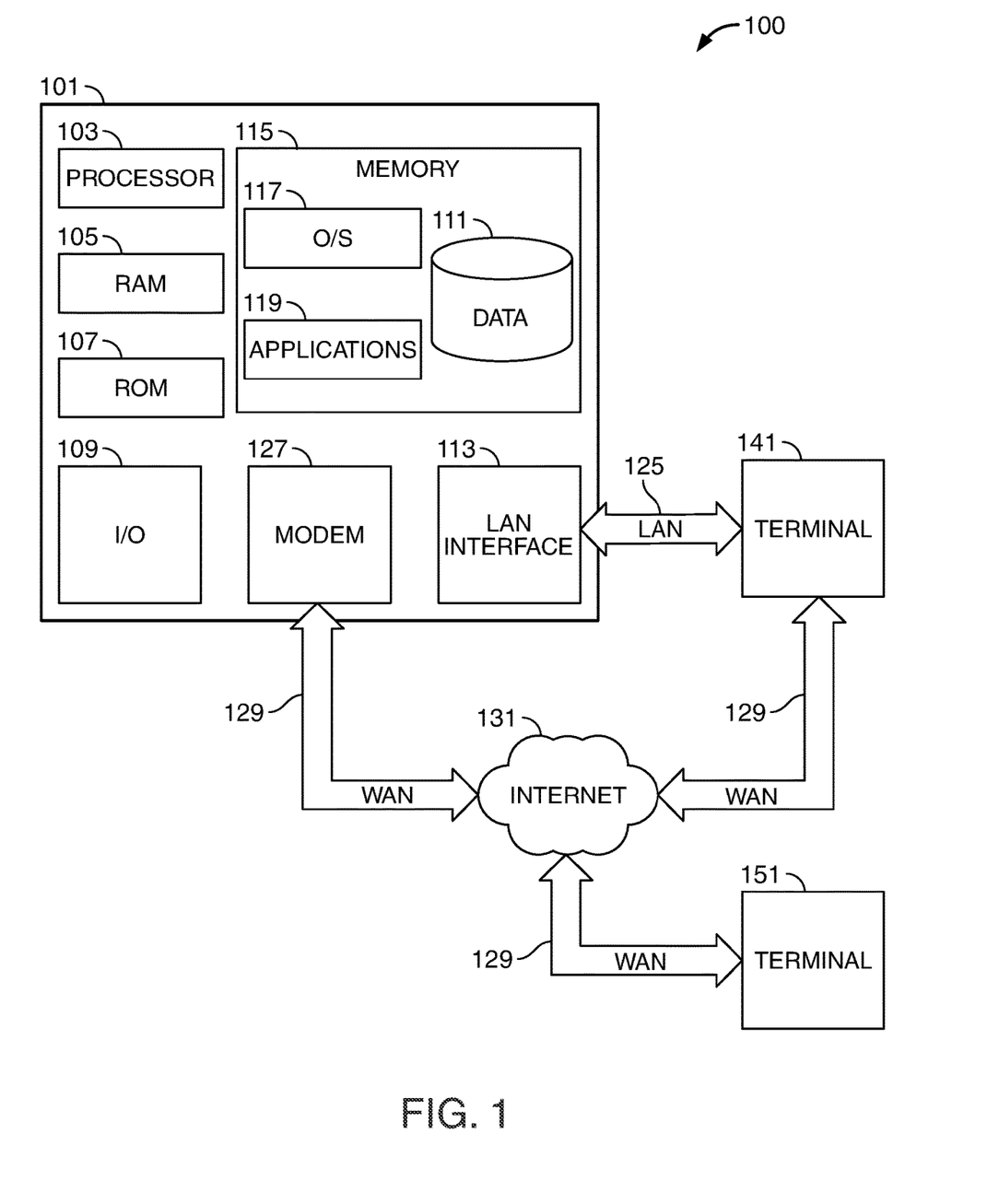
FIG. 1 shows an illustrative diagram in accordance with principles of the invention.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the nodes, the pre-detection monitor, the detection monitor, the artificial intelligence ("AI") models and any other part of the disclosure may include some or all of apparatus included in system 100.

Computer 101 may have a processor 103 for controlling the operation of the device and its associated components and may include RAM (Random Access Memory) 105, ROM (Read Only Memory) 107, input/output circuit 109 and a non-transitory or non-volatile memory 115. Machine-readable memory may be configured to store information in machine-readable data structures. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text and/or audio assistance files. Nodes, the AI models, the databases, the pre-detection monitors and the detection monitors as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a WAN (Wide Area Network) networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS) and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
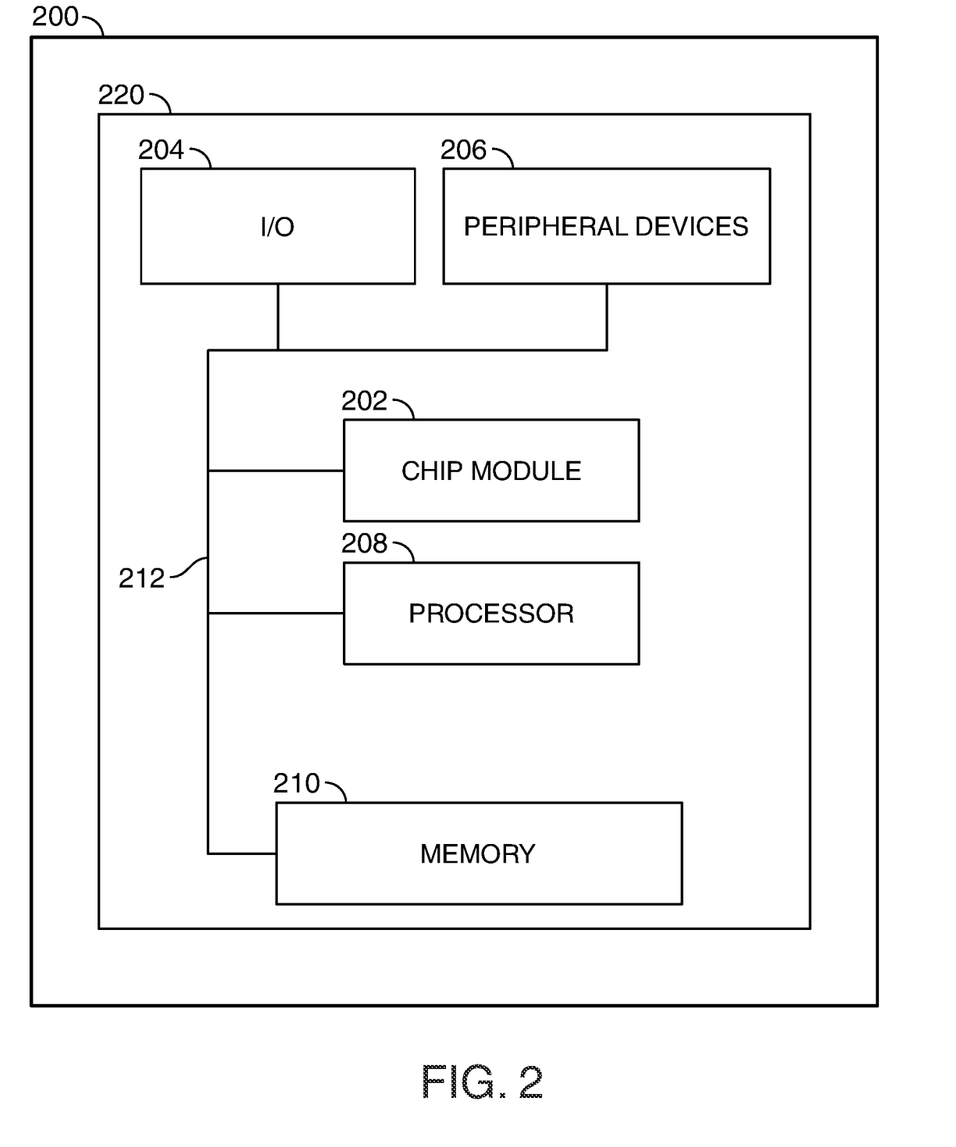
FIG. 2 shows another illustrative diagram in accordance with principles of the invention.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
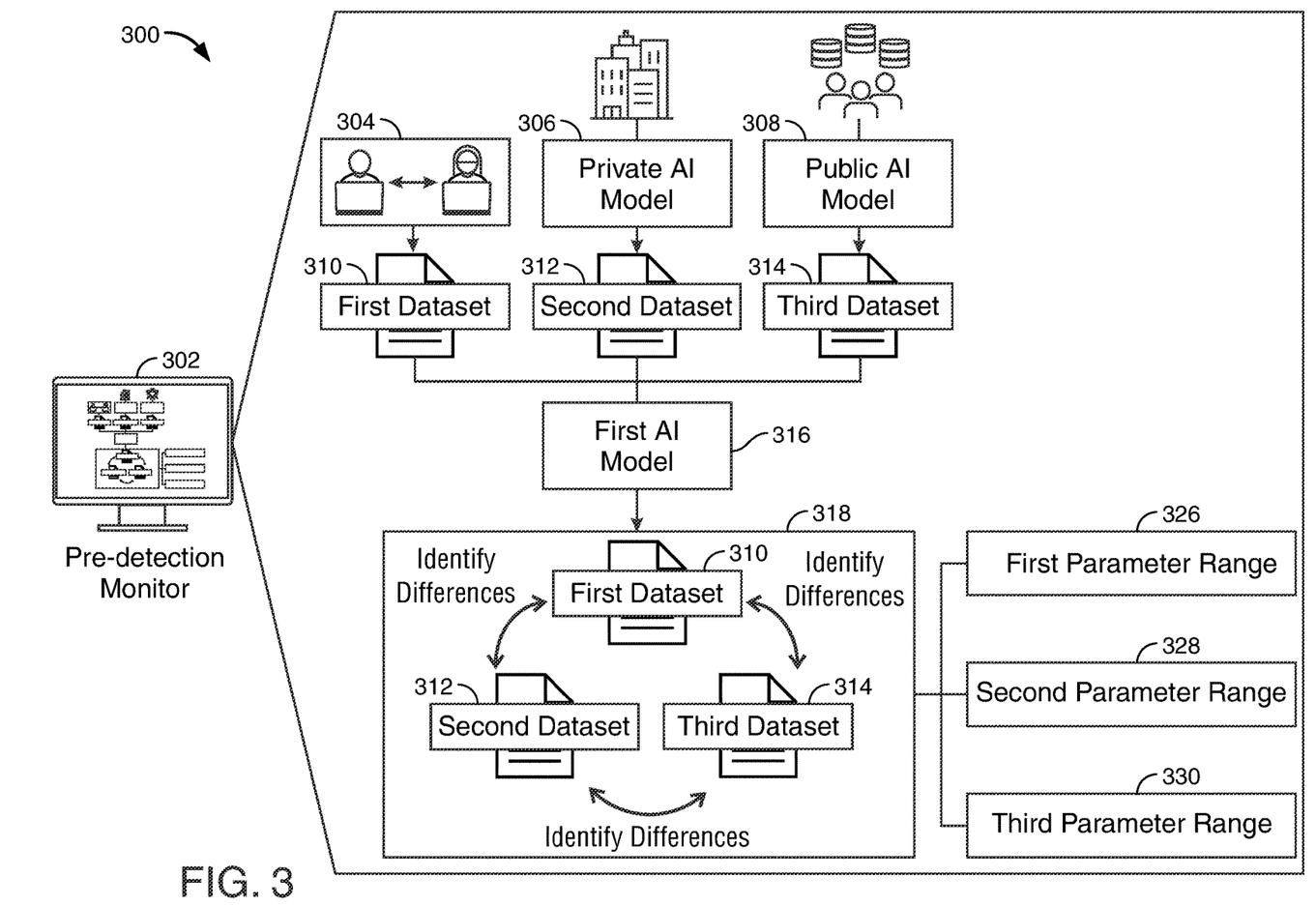
FIG. 3 shows yet another illustrative diagram in accordance with principles of the invention.

FIG. 3 shows illustrative process 300. Process 300 includes pre-detection monitor 302. Pre-detection monitor 302 may include a node. The node may be a laptop, smartphone, mainframe computer, desktop computer, tablet or any other suitable computing devices. Pre-detection monitor 302 may include one or more features as described in FIGS. 1 and 2. Pre-detection monitor 302 may train first AI model 316. Pre-detection monitor 302 may train first AI model 316 to detect an AI impersonation of a communication.

Pre-detection model 302 may provide first AI model 316 with training datasets. Training datasets may include first dataset 310, second dataset 312 and third dataset 314. First dataset 310 may include communication 304. Communication 304 may be a communication between two or more human users. Second dataset 312 may include a first intentional impersonation of communication 304. The first intentional impersonation may include a first deliberate impersonation of the communication. First AI model 316 may generate the first intentional impersonation of the communication. First AI model 316 may generate the first intentional impersonation using private AI model 306. Private AI model 306 may be trained with private data relating to a specific entity or person. Third dataset 314 may include a second intentional impersonation of communication 304. The second intentional impersonation may include a second deliberate impersonation of the communication. First AI model 316 may generate the second intentional impersonation of the communication. First AI model 316 may generate the second intentional impersonation using public AI model 308. Public AI model 308 may be trained with publicly available data.

First AI model 316 may compare first dataset 310, second dataset 312 and third dataset 314 using comparer 318. First AI model 316 may identify differences between first dataset 310, second dataset 312 and third dataset 314. First AI model 316 may identify a set of identifiers for each of the first dataset 310, second dataset 312 and third dataset 314 based on the identified differences. Using the identified differences, first AI model 316 may identify first parameter range 326, second parameter range 328 and third parameter range 330. First parameter range 326 may include identifiers indicating that the communication is a human communication. Second parameter range 328 may include identifiers indicating that the communication is a private AI communication. Third parameter range 330 may include identifiers indicating that the communication is a public AI communication.

Figure 4:
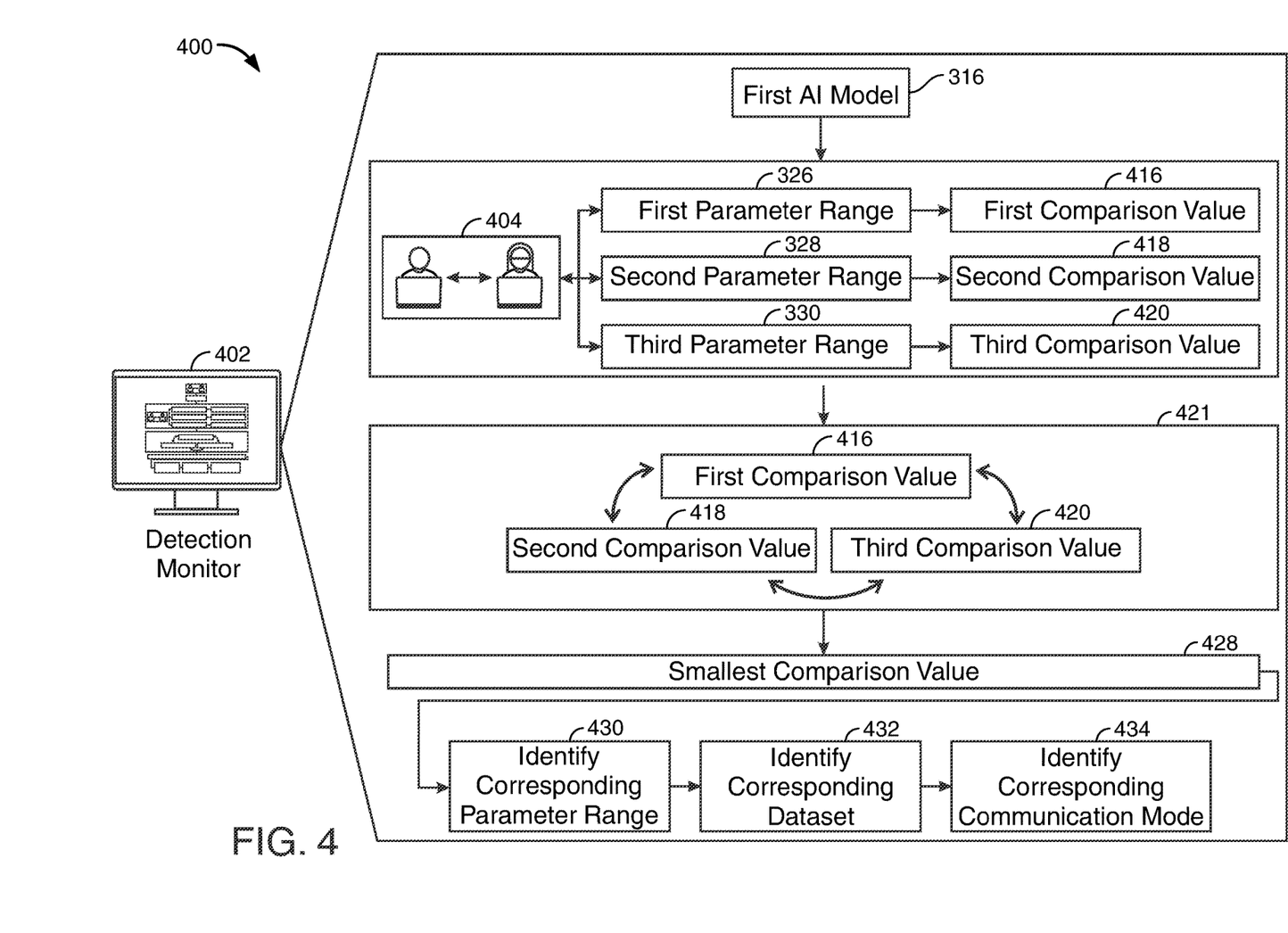
FIG. 4 shows still another illustrative diagram in accordance with principles of the invention.

FIG. 4 show illustrative process 400. Process 400 includes detection monitor 402. Detection monitor 402 may include a node. The node may be a laptop, smartphone, mainframe computer, desktop computer, tablet or any other suitable computing devices. Detection monitor 402 may include one or more features as described in FIGS. 1 and 2. Detection monitor 402 may be used to monitor production communications. Production communications may include telephone conversations, email message threads, video calls and any other suitable communication between two or more users.

Detection monitor 402 may monitor communication 404. Detection monitor 402 may monitor communication 404 using first AI model 316. First AI model 316 may compare production communication 404 with first parameter range reference 326, second parameter range reference 328 and third parameter range reference 330. The comparison between production communication 404 and first parameter range reference 326 may output first comparison value 416. The comparison between production communication 404 and second parameter range reference 328 may output second comparison value 418. The comparison between production communication 404 and third parameter range reference 330 may output third comparison value 420. Comparison values 416, 418 and 420 may indicate a numerical metric of discrepancies between production communication and parameter ranges, 326, 328 and 330 respectively.

First AI model 316 may compare first comparison value 416, second comparison value 418 and third comparison value 420 in comparer 421. First AI model 316 may determine smallest comparison value 428 based on the comparing of first comparison value 416, second comparison value 418 and third comparison value 420. First AI model 316 may identify corresponding parameter range 430. First AI model 316 may identify corresponding dataset 432. First AI model 316 may identify corresponding communication mode 434.

Figure 5:
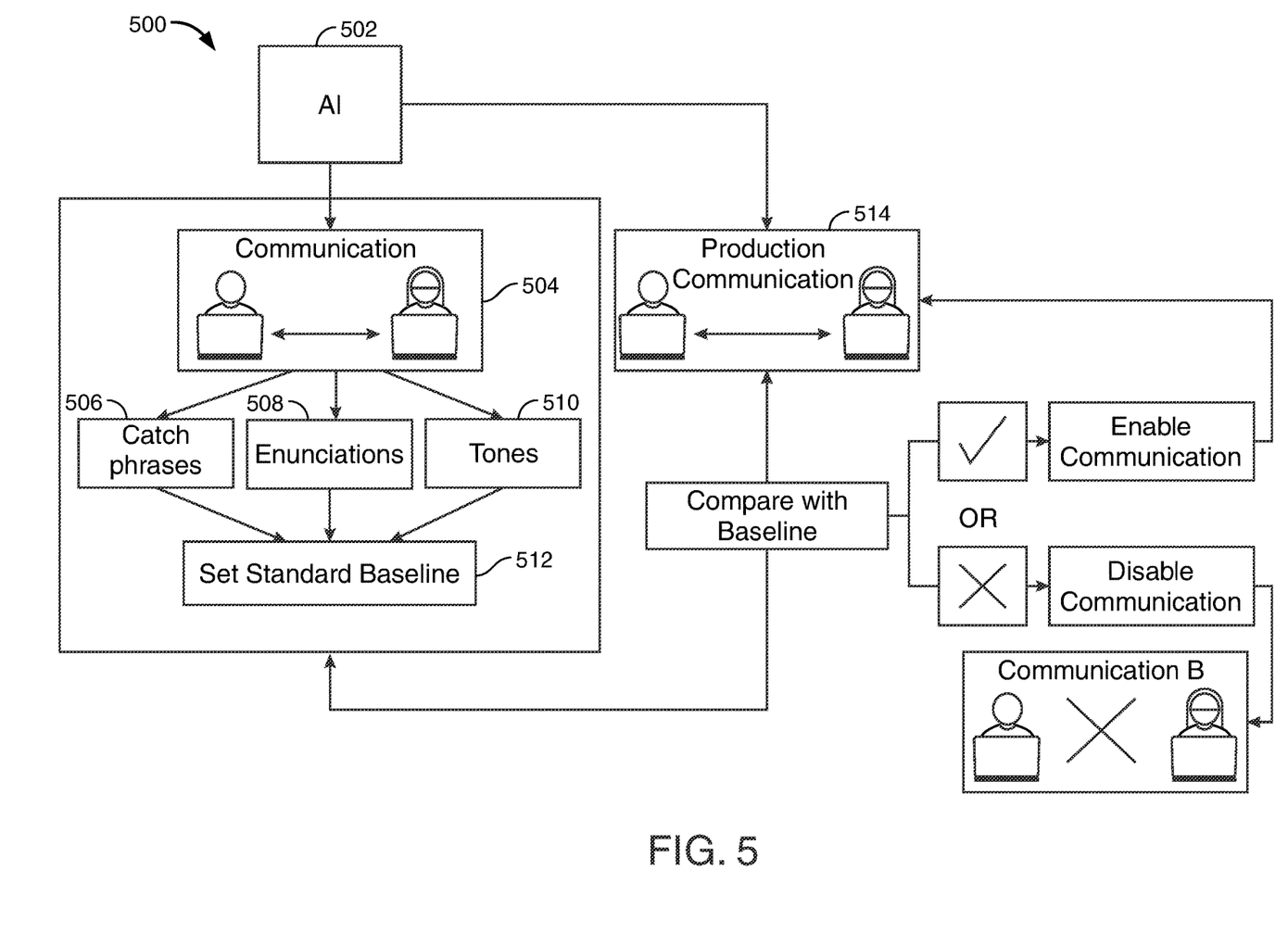
FIG. 5 shows yet another illustrative diagram in accordance with principles of the invention.

FIG. 5 shows illustrative process 500. Process 500 may include training AI model 502. AI model 502 may be trained with communication 504. Communication 504 may be a historical communication between two or more human users. AI model 502 may identify catch phrases 506, enunciations 508, and tones 510 from communication 504. Catch phrases 506, enunciations 508, and tones 510 may be specific to the two or more users included in communication 504. AI model 502 may set standard baseline 512 based on catch phrases 506, enunciations 508, and tones 510.

AI model 502 may monitor production communication 514. Production communication 514 may be compared to baseline 512. When the catch phrases, tones, and enunciations compared to the baseline are greater than a predetermined threshold, production communication 514 may be enabled. When catch phrases, tones, and enunciations compared to the baseline are greater than a predicted threshold, communication 514 may be disabled.

Thus, methods and apparatus for an ARTIFICIAL INTELLIGENCE IMPERSONATION DETECTOR are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for detecting artificial intelligence (AI) impersonation, the method comprising:
   in a pre-detection stage, training a first AI model, said training comprising:
      receiving:
         a first dataset, the first dataset comprising a communication, the communication between two or more human users;
         a second dataset, the second dataset comprising an impersonation of the communication by a second AI model, the second AI model receiving data from a private database; and
         a third dataset, the third dataset comprising an impersonation of the communication by a third AI model, the third AI model receiving data from a public database;
      comparing the first, second and third datasets;
      based on the comparing, identifying:
         a first set of identifiers in the first dataset;
         a second set of identifiers in the second dataset; and
         a third set of identifiers in the third dataset;
      creating a parameter range reference, said creating comprising:
         using the first set of identifiers to determine a first parameter range;
         using the second set of identifiers to determine a second parameter range; and
         using the third set of identifiers to determine a third parameter range;
   in a detection stage, monitoring a production communication, said monitoring using the first AI model, said monitoring comprising:
      comparing the production communication to the first parameter range, said comparing outputting a first comparison value;
      comparing the production communication to the second parameter range, said comparing outputting a second comparison value;
      comparing the production communication to the third parameter range, said comparing outputting a third comparison value;
      identifying a smallest comparison value from the first, second, and third comparison values;
      identifying a parameter range from the first, second, and third parameter ranges corresponding the identified smallest comparison value;
      identifying a dataset from the first, second and third datasets corresponding to the identified parameter range; and
      based on the identified dataset, detecting that the production communication is a human communication, a private AI communication or a public AI communication.

2. The method of claim 1 wherein the production communication is a real-time communication.

3. The method of claim 2 wherein the first AI model detects that the production communication is a public AI model generated communication, the method further comprising terminating the production communication.

4. The method of claim 2 wherein the first AI model detects that the production communication is a private AI model generated communication, the method further comprising terminating the production communication.

5. The method of claim 2 wherein the first AI model detects that the production communication is a human communication, the method further comprising enabling the communication to continue.

6. The method of claim 1 wherein the production communication is a historical communication.

7. The method of claim 6 wherein the first AI model detects that production communication is generated by a private AI model or a public AI model, the method further comprising flagging the communication as an impersonation communication.

8. The method of claim 7, the method further comprising transmitting an impersonation notification message to the two or more human users notifying the two or more human users of the impersonation communication.

9. The method of claim 1 wherein the first, second and third comparison values are numerical metrics of discrepancies between the production communication and corresponding compared parameter range.

10. The method of claim 1 further comprising using testing and training datasets to dynamically update training of the first AI model.

11. An apparatus for detecting artificial intelligence (AI) impersonation, the apparatus comprising:
   a pre-detection monitor, the pre-detection monitor configured to train a first AI model, the first AI model configured to:
      receive:
         a first dataset, the first dataset comprising a communication, the communication between two or more human users;
         a second dataset, the second dataset comprising an impersonation of the communication by a second AI model, the second AI model receiving data from a private database; and
         a third dataset, the third dataset comprising an impersonation of the communication by a third AI model, the third AI model receiving data from a public database;
      compare the first, second and third datasets;
      based on the comparison, identify:
         a first set of identifiers in the first dataset;
         a second set of identifiers in the second dataset; and
         a third set of identifiers in the third dataset;
      create a parameter range reference, the first AI model configured to:
         use the first set of identifiers to determine a first parameter range;
         use the second set of identifiers to determine a second parameter range; and
         use the third set of identifiers to determine a third parameter range; and
   a detection monitor, the detection monitor configured to monitor a production communication using the first AI model, said detection monitor configured to:
      compare the production communication to the first parameter range, the first AI model configured to output a first comparison value;
      compare the production communication to the second parameter range, said comparison configured to output a second comparison value;

compare the production communication to the third parameter range, said comparison configured to output a third comparison value;

identify a smallest comparison value from the first, second, and third comparison values;

identify a parameter range from the first, second, and third parameter ranges corresponding the identified smallest comparison value;

identify a dataset from the first, second and third datasets corresponding to the identified parameter range; and based on the identified dataset, detect that the production communication is a human communication, a private AI communication or a public AI communication.

12. The apparatus of claim 11 wherein the production communication is a real-time communication.

13. The apparatus of claim 12 wherein the first AI model detects that the production communication is generated by a public AI model, the detection monitor further configured to terminate the production communication.

14. The apparatus of claim 12 wherein the first AI model detects that the production communication is generated by a private AI model, the detection monitor further configured to terminate the production communication.

15. The apparatus of claim 12 wherein the first AI model detects that the production communication is a human communication, the detection monitor further configured to enable the communication to continue.

16. The apparatus of claim 11 wherein the production communication is a historical communication.

17. The apparatus of claim 16 wherein the first AI model is further configured to detect that the production communication is generated by a private AI model or a public AI model, the detection monitor further configured to flag the communication as an impersonation communication.

18. The apparatus of claim 17, the detection monitor further configured to transmit an impersonation notification message to the two or more human users notifying the two or more human users of the impersonation communication.

19. The apparatus of claim 11 wherein the first, second and third comparison values are numerical metrics of discrepancies between the production communication and corresponding compared parameter ranges.

20. The apparatus of claim 11 wherein the pre-detection monitor is configured to use testing and training datasets to dynamically update training of the first AI model.

* * * * *

UNITED STATES PATENT AND TRADEMARK OFFICE
CERTIFICATE OF CORRECTION

Page 1 of 1

PATENT NO. : 12,326,923 B2
APPLICATION NO. : 18/224187
DATED : June 10, 2025
INVENTOR(S) : Manu Kurian et al.

It is certified that error appears in the above-identified patent and that said Letters Patent is hereby corrected as shown below:

On the Title Page

Item (72), please replace inventor "Vinesh Young Patel" with --Vinesh Patel--.

Signed and Sealed this
Second Day of September, 2025

Coke Morgan Stewart
*Acting Director of the United States Patent and Trademark Office*